United States Patent
Ota

(10) Patent No.: US 12,454,615 B2
(45) Date of Patent: Oct. 28, 2025

(54) CURABLE ORGANOPOLYSILOXANE COMPOSITION, THERMALLY CONDUCTIVE MEMBER AND HEAT DISSIPATION STRUCTURE

(71) Applicant: DOW TORAY CO., LTD., Tokyo (JP)

(72) Inventor: Kenji Ota, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 143 days.

(21) Appl. No.: 18/021,669

(22) PCT Filed: Jun. 21, 2021

(86) PCT No.: PCT/JP2021/023451
§ 371 (c)(1),
(2) Date: Feb. 20, 2023

(87) PCT Pub. No.: WO2022/038888
PCT Pub. Date: Feb. 24, 2022

(65) Prior Publication Data
US 2023/0357571 A1    Nov. 9, 2023

(30) Foreign Application Priority Data
Aug. 21, 2020    (JP) .................................. 2020-139762

(51) Int. Cl.
*C08L 83/04*    (2006.01)

(52) U.S. Cl.
CPC .......... *C08L 83/04* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 8,138,254 B2 * | 3/2012 | Fukui | ...................... | C08L 83/04 524/430 |
| 2004/0254275 A1 | 12/2004 | Fukui et al. | | |
| 2007/0149834 A1 | 6/2007 | Endo et al. | | |
| 2009/0230348 A1 | 9/2009 | Fukui | | |
| 2010/0140538 A1 | 6/2010 | Sekiba | | |
| 2016/0197025 A1 * | 7/2016 | Bhagwagar | ............ | C09J 183/04 438/118 |
| 2017/0022326 A1 * | 1/2017 | Enami | ...................... | C08K 5/56 |
| 2020/0239758 A1 | 7/2020 | Ota | | |
| 2020/0270500 A1 | 8/2020 | Ota | | |

FOREIGN PATENT DOCUMENTS

| | | | |
|---|---|---|---|
| CN | 111051433 A | 4/2020 | |
| CN | 111094458 A | 5/2020 | |
| JP | 2005325212 A | 11/2005 | |
| JP | 2006274155 A * | 10/2006 | .............. C08L 83/04 |
| JP | 2007177001 A | 7/2007 | |
| JP | 2008239719 A | 10/2008 | |
| JP | 2012067153 A | 4/2012 | |
| WO | 2016038836 A1 | 3/2016 | |
| WO | 2019061290 A1 | 4/2019 | |
| WO | 2020093258 A1 | 5/2020 | |

OTHER PUBLICATIONS

Machine assisted English translation of JP20162067153A obtained from https://patents.google.com/patent on Mar. 26, 2024, 15 pages.
Machine assisted English translation of JP2005325212A obtained from https://patents.google.com/patent on Mar. 26, 2024, 16 pages.
English translation of International Search Report for PCT/JP2021/023451 dated Aug. 24, 2021, 2 pages.
Machine assisted English translation of WO2016038836A1 obtained from https://patents.google.com/patent on Feb. 14, 2023, 19 pages.

* cited by examiner

*Primary Examiner* — Robert S Jones, Jr.
*Assistant Examiner* — Lily K Sloan
(74) *Attorney, Agent, or Firm* — Warner Norcross + Judd LLP

(57) ABSTRACT

A curable organopolysiloxane composition is provided. The composition provides an organopolysiloxane cured product that can be cured at low temperatures while having high thermal conductivity and that can achieve high initial adhesion and adhesive strength to various base materials in contact during the curing process. A thermally conductive member containing the composition, and a heat dissipating structure using the member, are also provided. The curable organopolysiloxane composition comprises (A) an alkenyl group-containing organopolysiloxane having a specific viscosity, (B) an organohydrogenpolysiloxane, (C) a hydrosilylation-reaction catalyst, (D) a thermally conductive filler, (E) a siloxane compound having an alkenyl group and a hydrolyzable silyl group on ends of a specific molecular chain, (F) an alkoxysilane having an alkyl group with 6 or more carbon atoms or a hydrolyzed condensate thereof, and (G) an adhesion promoter.

20 Claims, No Drawings

CURABLE ORGANOPOLYSILOXANE COMPOSITION, THERMALLY CONDUCTIVE MEMBER AND HEAT DISSIPATION STRUCTURE

CROSS-REFERENCE TO RELATED APPLICATIONS

This application is the U.S. National Stage of International Application No. PCT/JP2021/023451 filed on 21 Jun. 2021, which claims priority to and all advantages of Japanese Application No. 2020-139762 filed on 21 Aug. 2020, the content of which is incorporated herein by reference.

TECHNICAL FIELD

The present invention relates to: a curable organopolysiloxane composition that provides an organopolysiloxane cured product that can be cured at low temperatures while having high thermal conductivity and that can achieve high initial adhesion and adhesive strength to various base materials in contact during the curing process; a thermally conductive member containing the composition; and a heat dissipating structure using the member.

BACKGROUND ART

In recent years, in order to efficiently dissipate the heat generated by electronic and electric equipment, such as electronic components and batteries, along with the high-density and high-integration on printed circuit boards and hybrid ICs on which electronic components, such as transistors, ICs, and memory elements, are mounted, and the increase in the capacity of secondary batteries (cell type), thermally conductive silicone compositions including organopolysiloxane, aluminum oxide powder, zinc oxide powder, and other thermally conductive fillers have been widely used and thermally conductive silicone composition filled with large amounts of thermally conductive filler have been proposed.

For example, Patent Document 1 proposes a silicone elastomer containing a macromonomer siloxane component having an alkenyl group and alkoxysilyl group in a molecule and a silane compound having a hydrolyzable group (e.g., methyl trimethoxysilane or the like), and that has little change in hardness after thermal aging even when filled with a large amount of a thermally conductive filler. Similarly, Patent Document 2 proposes a thermally conductive silicone rubber composition with excellent mechanical rubber properties, containing a macromonomer siloxane component having an alkoxysilyl group in a molecule, 3-glycidoxypropyltrimethoxysilane, and the like. As described in the examples and the like, these thermally conductive silicone compositions are usually cured by heating at a high temperature of 150° C. or higher, and can achieve a certain adhesive force with respect to a base material. However, there is still room for improvement, particularly in achieving a high thermal conductivity of 3.0 W/mK or higher and permanent adhesion. On the other hand, Patent Document 3 proposes a thermally conductive silicone grease composition that contains a macromonomer siloxane component having an alkoxysilyl group or the like in a molecule and a silane compound having a long-chain alkyl group with 9 to 15 carbon atoms, and that maintains fluidity and has excellent handleability. However, such a grease composition is a fluid liquid composition and does not provide a thermally conductive silicone rubber (elastomer) cured product with excellent initial and permanent adhesion and sufficient mechanical strength upon thermal curing, and applicable situations are different from those of silicone rubber cured products.

Furthermore, in recent years, in the production of electronic components for automobiles and the like, there is a trend toward requiring a curing process at a low temperature of around 120° C. and a short amount of time in order to reduce the energy consumption required in the production process and to avoid causing defects in electronic circuits and the like due to exposure to high temperatures. However, curable silicone compositions that contain large amounts of a thermally conductive filler and are cured by a hydrosilylation reaction generally tend to have lower initial adhesion and permanent adhesive strength as the curing temperature decreases. Thus, there is a strong need for a curable organopolysiloxane composition that can achieve excellent adhesive performance in a low temperature curing process, in addition to forming a silicone rubber cured product with excellent mechanical strength by curing and achieving high thermal conductivity and initial and permanent adhesive strength.

PRIOR ART DOCUMENTS

Patent Documents

Patent Document 1: Japanese Unexamined Patent Application 2008-239719
Patent Document 2: Japanese Unexamined Patent Application 2006-274155
Patent Document 3: Japanese Unexamined Patent Application 2007-177001

SUMMARY OF THE INVENTION

Problem to be Solved by the Invention

In view of the foregoing, an object of the present invention is to provide: a curable organopolysiloxane composition that is highly thermally conductive due to being highly filled with a thermally conductive inorganic filler, that provides a cured product with high initial adhesion and adhesive strength, particularly excellent adhesive durability and permanent adhesion, and practically sufficient mechanical strength, with respect to various base materials in contact during curing, even in a low temperature curing process of approximately 120° C.; a thermally conductive member containing the composition; and a heat dissipating structure using the member.

Means for Solving the Problem

As a result of extensive studies, the present inventors discovered that the aforementioned problem can be solved by a curable organopolysiloxane composition that is a hydrosilylation reaction-curable composition containing a large amount of a thermally conductive filler to provide high thermal conductivity, and containing a siloxane compound having an alkenyl group and a hydrolyzable silyl group at ends of a molecular chain, alkoxysilane having a long-chain alkyl group with 6 or more carbon atoms or a hydrolyzed condensate thereof, and an adhesion promoter, thereby arriving at the present invention. Note that the adhesion promoter is preferably a combination of specific silicon-based adhesion promoters, and a thermally conductive filler is particularly preferably surface-treated in advance by an alkenyl group-containing organopolysiloxane, which is a base compound of the composition, the aforementioned siloxane compound, and alkoxysilane having a long-chain alkyl group or a hydrolyzed condensate thereof.

Specifically, an object of the present invention is solved by:

a curable organopolysiloxane composition, containing:

(A) 100 parts by mass of an alkenyl group-containing organopolysiloxane having a viscosity of 10 to 100,000 mPa·s at 25° C.;

(B) an organohydrogenpolysiloxane of an amount in which silicon atom-bonded hydrogen atoms in component (B) are 0.1 to 10 mols with respect to 1 mol of alkenyl groups in component (A);

(C) a hydrosilylation-reaction catalyst in a catalytic amount;

(D) 400 to 3,500 parts by mass of a thermally conductive filler;

(E) 0.005 to 20 parts by mass of a siloxane compound expressed by general formula (1):

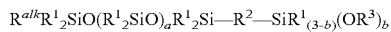

(where $R^{alk}$ represents an alkenyl group, $R^1$ independently represents an unsubstituted or substituted monovalent hydrocarbon group, $R^2$ represents an oxygen atom or divalent hydrocarbon group, $R^3$ independently represents a hydrogen atom, alkyl group, alkoxyalkyl group, or acyl group, a represents an integer from 1 to 250, and b represents an integer from 1 to 3), having a viscosity at 25° C. within a range of 10 to 10,000 mPa·s, and having an alkenyl group or hydrolyzable silyl group on a molecular chain terminal;

(F) 0.005 to 10 parts by mass of an alkoxysilane having an alkyl group with 6 or more carbon atoms in a molecule or a hydrolyzed condensate thereof; and (G) 0.005 to 5 parts by mass of an adhesion promoter; as well as a cured product thereof; a thermally conductive member containing the composition; a heat dissipating structure using the member; and a manufacturing method of these.

Effects of the Invention

The present invention provides a curable organopolysiloxane composition that is highly thermally conductive that provides a cured product with high initial adhesion and adhesive strength, particularly excellent adhesive durability and permanent adhesion, and practically sufficient mechanical strength, with respect to various base materials in contact during curing, even in a low temperature curing process of approximately 120° C. Furthermore, the present invention can provide a thermally conductive member obtained by curing the curable organopolysiloxane composition, and a heat dissipating structure using the member (in particular, a heat dissipating structure of an electrical or electronic device, including a heat dissipating structure of an electrical or electronic component and a heat dissipating structure of a secondary battery). Furthermore, the present invention provides a method of manufacturing a heat dissipating structure employing a low temperature curing process by using the curable organopolysiloxane composition described above.

MODE FOR CARRYING OUT THE INVENTION

[Curable Organopolysiloxane Composition]

The composition according to the present invention contains (A) an alkenyl group-containing organopolysiloxane having a viscosity of 10 to 100,000 mPa·s at 25° C., (B) an organohydrogenpolysiloxane, (C) a hydrosilylation-reaction catalyst, (D) a thermally conductive filler, (E) a siloxane compound expressed by general formula (1):

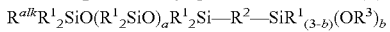

(where $R^{alk}$ represents an alkenyl group, $R^1$ independently represents an unsubstituted or substituted monovalent hydrocarbon group, $R^2$ represents an oxygen atom or divalent hydrocarbon group, $R^3$ independently represents a hydrogen atom, alkyl group, alkoxyalkyl group, or acyl group, a represents an integer from 4 to 250, and b represents an integer from 1 to 3), having a viscosity at 25° C. within a range of 10 to 10,000 mPa·s, and having an alkenyl group or hydrolyzable silyl group on a molecular chain terminal, (F) an alkoxysilane having an alkyl group with 6 or more carbon atoms in a molecule or a hydrolyzed condensate thereof, and (G) an adhesion promoter, which may contain a hydrosilylation reaction inhibitor or other arbitrary additive, may be a one-component composition, or may be a multi-component composition of two components or more.

Hereinafter, each component, added amount thereof, and the like will be described.

[(A) Alkenyl Group-Containing Organopolysiloxane]

The alkenyl group-containing organopolysiloxane, which is component (A), is the main agent of the present composition, having a viscosity within a range of 10 to 100,000 mPa·s at 25° C. The viscosity of component (A) at 25° C. is preferably within a range of 10 to 100,00 mPa·s, and more preferably within a range of 10 to 10,000 mPa·s. If the viscosity of component (A) is less than 10 mPa·s, the mechanical strength of the resulting organopolysiloxane cured product tends to decrease. On the other hand, if the viscosity of component (A) exceeds 100,000 mPa·s, the resulting composition is too high in viscosity, and the handling workability and coatability on fine parts tend to decrease.

Component (A) is formed by one or two or more alkenyl group-containing organopolysiloxanes. The molecular structure of such an alkenyl group-containing organopolysiloxane is not particularly limited, with examples thereof including straight-chain, branched, cyclic, three-dimensional network structures, and combinations thereof. Examples of alkenyl groups in a molecule of component (A) include vinyl groups, allyl groups, butenyl groups, hexenyl groups, and the like. Furthermore, examples of organic groups other than alkenyl groups in component (A) include: methyl groups and other alkyl groups; phenyl groups and other aryl groups; and monovalent hydrocarbon groups other than alkenyl groups such as 3,3,3-trifluoropropyl groups and other halogenated alkyl groups, but methyl groups or phenyl groups are preferred from an industrial perspective.

Component (A) is particularly preferably a straight-chain alkenyl group-containing organopolysiloxane, with examples including: dimethylpolysiloxane blocked with dimethylvinylsiloxy groups at both ends of a molecular chain; a dimethylsiloxane/methylphenylsiloxane copolymer blocked with dimethylvinylsiloxy groups at both ends of a molecular chain; a dimethylsiloxane/methylvinylsiloxane copolymer blocked with trimethylsiloxy groups at both ends of a molecular chain; a dimethylsiloxane/methylvinylsiloxane/methylphenylsiloxane copolymer blocked with trimethylsiloxy groups at both ends of a molecular chain; a dimethylsiloxane/methylvinylsiloxane copolymer blocked with silanol groups at both ends of a molecular chain; polymers in which a portion of the methyl groups of these polymers are substituted with alkyl groups other than methyl groups such as ethyl groups, propyl groups, and the like, and halogenated alkyl groups such as 3,3,3-trifluoropropyl groups and the like; polymers in which vinyl groups of these polymers are substituted with alkenyl groups other than vinyl groups such as allyl groups, butenyl groups, hexenyl groups, and the like; and mixtures of two or more of these polymers. Note that regarding these alkenyl group-containing organopolysiloxanes, in terms of preventing contact failure, etc., low molecular weight siloxane oligomers (octamethyltetrasiloxane (D4) and decamethylpentasiloxane (D5)) are preferably reduced or eliminated.

[(B) Organohydrogenpolysiloxane]

Component (B) is a main crosslinking agent of the composition of the present invention and while an organohydrogenpolysiloxane having two or more silicon atom-bonded hydrogen atoms in a molecule can be used without limitation, from the perspective of the flexibility and adhesion retention of the resulting cured product to a base material, the number (average value) of silicon atom-bonded hydrogen atoms in the organohydrogenpolysiloxane molecule preferably does not exceed 8. In particular, it is preferable to at least include (B1) a straight-chain organohydrogenpolysiloxane having a viscosity at 25° C. of 1 to 1,000 mPa·s and containing on average 2 to 4 silicon atom-bonded hydrogen atoms in the molecule, of which at least an average of 1 is in a molecular side chain.

Examples of component (B1) include: a methylhydrogen siloxane-dimethylsiloxane copolymer capped at both molecular terminals with trimethylsiloxy groups and a methylhydrogen siloxane-dimethylsiloxane copolymer capped at both molecular terminals with dimethylhydrogensiloxy groups. Note, these examples are non-limiting, and some of the methyl groups may be substituted with phenyl groups, hydroxyl groups, alkoxy groups, and the like.

While the viscosity of component (B1) at 25° C. is not particularly limited, the viscosity is preferably within a range of 1 to 500 mPa·s, and particularly preferably within a range of 1 to 100 mPa·s. Moreover, from the perspective of preventing contact failure and the like, the amount of low molecular weight siloxane oligomer (octamethyltetrasiloxane (D4) and decamethylpentasiloxane (D5)) is preferably reduced or eliminated.

[Amount of the Organohydrogenpolysiloxane (Crosslinking Agent) in the Composition]

The composition of the present invention requires that the amount of silicon atom-bonded hydrogen atoms in component (B) be within a range of 0.1 to 10 mols with respect to 1 mol of alkenyl groups in at least component (A). The amount is particularly preferably within a range of 0.3 to 3.0 mols, or 0.4 to 2.0 mols, from the perspective of the mechanical strength and adhesive properties of the resulting organopolysiloxane cured product.

[(C) Hydrosilylation Reaction Catalyst]

The hydrosilylation-reaction catalyst is a component required in curing the present composition. Examples include a platinum-based catalyst, a rhodium-based catalyst, and a palladium-based catalyst, and a platinum-based catalyst is preferred because a platinum-based catalyst can significantly promote curing of the present composition. Exemplary platinum-based catalysts include platinum fine powder, chloroplatinic acid, an alcohol solution of chloroplatinic acid, a platinum-alkenyl siloxane complex, a platinum-olefin complex, a platinum-carbonyl complex, and a catalyst in which these platinum-based catalysts are dispersed or encapsulated with a thermoplastic resin such as silicone resin, polycarbonate resin, acrylic resin, or the like, with a platinum-alkenyl siloxane complex particularly preferable. In particular, a 1,3-divinyl-1,1,3,3-tetramethyldisiloxane complex of platinum is preferred, and is preferably added in the form of an alkenylsiloxane solution of the complex. In addition, in terms of improving the handleability as well as the pot life of the composition, a platinum containing hydrosilylation reaction catalyst in microparticles dispersed and encapsulated with thermoplastic resin may be used. Note that as the catalyst for promoting the hydrosilylation reaction, a non-platinum based metal catalyst such as iron, ruthenium, iron/cobalt, or the like may be used.

On the other hand, a so-called high energy beam-activated or photoactivated catalyst such as a (methylcyclopentadienyl)trimethyl platinum(IV) complex, bis(2,4-pentanedionato) platinum(II) complex, or the like may be used as the hydrosilylation-reaction catalyst. By using such a hydrosilylation-reaction catalyst, the composition as a whole can be cured even at low temperatures triggered by irradiation with a high energy beam, storage stability is excellent, and reaction control is facilitated. Thus, the properties of excellent handling workability may be achieved. In this case, ultraviolet light is preferred as the high energy beam from the perspective of catalytic activation efficiency, and ultraviolet light in a wavelength range of 280 to 380 nm is preferred from the perspective of industrial use. Furthermore, the amount of irradiation varies depending on the type of high energy beam activated catalyst, but in the case of ultraviolet rays, the integrated amount of irradiation at a wavelength of 365 nm is preferably within a range of 100 mJ/cm$^2$ to 100 J/cm$^2$.

The amount of the hydrosilylation-reaction catalyst added is preferably an amount in which the metal atoms are within a range of 0.01 to 500 ppm, 0.01 to 100 ppm, or 0.01 to 50 ppm by mass with respect to the entire composition.

[(D) Thermally Conductive Filler]

Component (D) is a thermally conductive filler for imparting thermal conductivity to the present composition and a thermally conductive member obtained by curing the present composition. This manner of component (D) is preferably a powder and/or a fiber of at least one or more selected from the group consisting of a pure metal, an alloy, a metal oxide, a metal hydroxide, a metal nitride, a metal carbide, a metal silicide, a carbon, a soft magnetic alloy, and a ferrite. Of these, a metallic powder, a metal oxide powder, a metal nitride powder, or a carbon powder is suitable. The shape of component (D) is not particularly limited and includes, for example, a spherical shape, a needle shape, a disk shape, a rod shape, and an irregular shape, and is preferably a spherical shape or an irregular shape. The average particle diameter of component (D) is not particularly limited, but is preferably in the range of 0.01 to 500 μm, and more preferably in the range of 0.01 to 300 μm.

Component (D) is preferably silver powder, aluminum powder, aluminum oxide powder, zinc oxide powder, aluminum nitride powder or graphite. When electrical insulation is required for the present composition, a metal oxide powder or a metal nitride powder is preferable, and in particular, aluminum oxide powder, zinc oxide powder, or aluminum nitride powder is preferable.

Component (D) is particularly preferably (D1) a plate-shaped boron nitride powder with an average particle diameter of 0.1 to 150 μm, (D2) a granulated or spherically compacted boron nitride powder with an average particle diameter of 0.1 to 500 µm, (D3) a spherical melt-solidified and/or crushed aluminum oxide powder with an average particle diameter of 0.01 to 150 µm, (D4) an irregular or spherical aluminum nitride powder with an average particle diameter of 0.1 to 150 µm, (D5) a spherical and/or crushed graphite having an average particle diameter of 0.01 to 50 µm, or a mixture of two or more of these. One example of a suitable component (D) is a mixture of two or more types of spherical and crushed aluminum oxide powders having an average particle diameter of 0.01 to 50 µm. In particular, as typified by the examples of the present application, the combination of aluminum oxide powder with a large particle diameter and aluminum oxide powder with a small particle diameter in the ratio following the closest packing theoretical distribution curve improves the packing efficiency and enables low viscosity and high thermal conductivity.

The amount of component (D) is within a range of 400 to 3,500 parts by mass, preferably 500 to 3,000 parts by mass, and more preferably 600 to 2,500 parts by mass, with respect to 100 parts by mass of component (A) in the entire composition. This is because if the amount of component (D) is less than the lower limit of the above range, the thermal conductivity of the resulting composition may be less than 2.0 W/mK. On the other hand, if the amount of component (D) exceeds the upper limit of the above range, even when component (E) and component (F) to be described later are blended or used for surface-treating component (D), the viscosity of the resulting composition is remarkably high, and the handling workability, adhesive strength with respect to a base material, and the like may be reduced.

[Other Inorganic Fillers]

The composition of the present invention does not completely prevent the addition of an optional component such as fumed silica, wet silica, crushed quartz, titanium dioxide, magnesium carbonate, zinc oxide, iron oxide, silica earth, carbon black, or other inorganic fillers (also called "inorganic filling material"), the surfaces of such inorganic fillers being hydrophobically treated with component (E), component (F), and/or another organic silicon compound (silazanes or the like). However, from the perspective of achieving the technical effect of the present invention, particularly both high thermal conductivity and adhesive strength with respect to a base material, the composition may be substantially free of fillers other than component (D).

[Surface Treatment of Component (D)]

The composition contains a specific amount of two types of surface treatment agents with different chemical structures: component (E) and component (F). Specifically, taking the entire component (D) of the present invention as 100% by mass, these components are preferably blended in a range of 0.1 to 5.0% by mass, and component (D) is preferably surface treated using these components.

The surface treatment method using component (E) and component (F) is not particularly limited, but a direct treatment method on the thermally conductive inorganic filler of component (D), an integral blend method, a dry concentrate method, or the like can be used. In the present invention, from the perspective of improving the filling properties of the composition as a whole and the adhesive strength of the cured product, a most preferable example is a heat surface treatment method, in which some or all of the aforementioned component (A) as well as component (E) and component (F) are pre-mixed, and component (D) is sequentially mixed into the mixture and then heated (base heat) after homogenization. In the surface treatment method, the mixture can be heated and stirred at 100 to 200° C. under reduced pressure, and the temperature conditions and stirring time can be designed based on the amount of a sample, but are preferably within a range of 120 to 180° C. and 0.25 to 10 hours.

The device used for mixing described above is not particularly limited, and examples include single or double-shaft continuous mixers, double rolls, Ross mixers, Hobart mixers, dental mixers, planetary mixers, kneader mixers, Henschel mixers, and the like.

[(E) Siloxane Compound Having Alkenyl Group and Hydrolyzable Silyl Group at Ends of a Molecular Chain]

Component (E) is a surface treatment agent having a hydrolyzable silyl group at one end of a molecular chain, an alkenyl group at another end, and a polysiloxane structure. By performing surface treatment using component (D) in combination with component (F) described later, the mechanical strength and adhesive strength with respect to a base material of the organopolysiloxane cured product can be improved even when a large amount of the thermally conductive filler serving as component (D) is added.

Specifically, component (E) is a siloxane compound expressed by general formula (1):

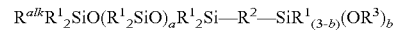

in which the viscosity at 25° C. is within a range of 10 to 10,000 mPa·s, and which has an alkenyl group and a hydrolyzable silyl group on ends of a molecular chain.

Herein, $R^{alk}$ represents an alkenyl group, and examples include vinyl groups, allyl groups, hexenyl groups, and other alkenyl groups with 2 to 10n carbon atoms. Component (E) has an alkenyl group at one end of a molecular chain, and therefore has excellent curability and adhesive properties when used in combination with component (D). If component (E) does not have alkenyl as a terminal functional group, sufficient adhesive properties cannot be achieved even if component (G) is used.

In the formula, $R^1$ independently represents an unsubstituted or substituted monovalent hydrocarbon group, with examples including straight-chain alkyl groups, branched alkyl groups, cyclic alkyl groups, alkenyl groups, aryl groups, aralkyl groups, or halogenated alkyl groups, and is a methyl group or phenyl group from an industrial perspective. $R^2$ represents an oxygen atom or a divalent hydrocarbon group. Examples of the divalent hydrocarbon group serving as $R^2$ include methylene groups and other alkylene groups; and ethylene oxyethylene groups, ethylene oxypropylene groups, and other alkyleneoxyalkylene groups. On the other hand, $R^2$ may be and is preferably an oxygen atom.

In the formula, $R^3$ independently represents a hydrogen atom, an alkyl group, an alkoxyalkyl group, or an acyl group, is preferably an alkyl group, and particularly preferably a methyl group or an ethyl group. Component (E) has a hydrolyzable silyl group in a molecule with a one-end structure expressed by $Si(OR^3)$, which provides excellent surface treatment effects when used in combination with component (D).

In the formula, a represents the degree of polymerization (excluding ends) of diorganosiloxane units of component (E), and is an integer from 1 to 250, preferably from 1 to 100, and particularly preferably from 1 to 50. This is because if a in the formula is less than the lower limit of the above range, it tends to be impossible to include a large amount of component (D) to obtain the composition of the composition of the present invention. On the other hand, if a exceeds the upper limit of the above range, the molecular volume constrained on the surface of component (D) excessively increases, and similarly, it tends to make it impossible to include a large amount of component (D) in the composition. Furthermore, b in the formula above represents an integer from 1 to 3, and is preferably 3. When b represents 3, one end of component (E) is particularly preferably a trimethoxysilyl group (—Si(OMe)₃).

The amount of component (E) added is sufficient for surface treatment of component (D) and is within a range of 0.005 to 20 parts by mass with respect to 100 parts by mass of component (A) in the entire composition, is preferably 0.05 to 15 parts by mass, and more preferably 0.5 to 10 parts by mass.

Note that compounds that can be used as component (E) are listed in paragraph [0021] and the like of Patent Document 2, for example, and one or more thereof may be used in the present invention.

[(F) C₆ or Higher Alkylalkoxysilane or Hydrolyzed Condensate Thereof]

Component (F) is a component that, together with component (E), functions as a surface treatment agent of component (D) in the composition, and improves the amount of component (D) added in the composition, the viscosity and fluidity of the entire composition, as well as the adhesive properties. The alkoxysilane must have a C₆ or higher alkyl group. If an alkylalkoxysilane containing only an alkyl group of less than C₆, such as a methyl group or the like, or a hydrolyzed condensate thereof is used, sufficient adhesive properties cannot be achieved even if used in combination with component (E) and component (G), which are described later.

Specific examples of the alkyl group with 6 or more carbon atoms include hexyl groups, octyl groups, dodecyl groups, tetradecyl groups, hexadecyl groups, octadecyl groups, and other alkyl groups, benzyl groups, phenylethyl groups, and other aralkyl groups, and the like. Alkyl groups with 6 to 20 carbon atoms are particularly preferred.

Preferably, component (F) is an alkoxysilane represented by the structural formula:

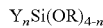

$$Y_nSi(OR)_{4-n}$$

(where Y represents an alkyl group with 6 to 18 carbon atoms, R represents an alkyl group with 1 to 5 carbon atoms, and n represents a number from 1 to 3).

Examples of the OR group include a methoxy group, an ethoxy group, a propoxy group, a butoxy group, and the like, and a methoxy group and an ethoxy group are particularly preferred.

Note that n represents 1, 2 or 3, and particularly preferably represents 1.

Examples of this component (E1) include: C₆H₁₃Si(OCH₃)₃, C₈H₁₇Si(OC₂H₅)₃, C₁₀H₂₁Si(OCH₃)₃, C₁₁H₂₃Si(OCH₃)₃, C₁₂H₂₅Si(OCH₃)₃, C₁₄H₂₉Si(OC₂H₅)₃, and the like, and most suitably decyltrimethoxysilane.

The amount of component (F) added is sufficient for surface treatment of component (D) and is within a range of 0.005 to 10 parts by mass with respect to 100 parts by mass of component (A) in the entire composition, is preferably 0.05 to 10 parts by mass, and more preferably 0.5 to 7.5 parts by mass.

[(G) Adhesion-Imparting Agent]

Component (G) is an adhesion-imparting agent, which, when used in combination with components (E) and (F) above, significantly improves the adhesive strength and permanent adhesion of the composition according to the present invention to the base material. On the other hand, even if only component (G) is added without the components (E) and (F) above, it is not possible to achieve a cured product that has both sufficient adhesive strength and permanent adhesion, particularly when cured at low temperatures. Conversely, if component (G) is not present, sufficient permanent adhesion cannot be achieved, particularly when cured at low temperatures, even if used in combination with components (E) and (F). In other words, the combination of these three components is essential in the present invention.

The adhesion-imparting agent of the present invention may be one or more selected from the following conventionally known adhesion-imparting agents, namely, reaction mixtures of an amino group-containing organoalkoxysilane and an epoxy group-containing organoalkoxysilane (including carbasilatrane derivatives and silatrane derivatives having a specific structure), organic compounds having two or more alkoxysilyl groups in a molecule, such as disilyalkane compounds (e.g., 1,6-bis(trimethoxysilyl)hexane), epoxy group-containing silanes or partially hydrolyzed condensates thereof, and two or more adhesion-imparting agents selected therefrom may and preferably are used in combination.

Preferably, component (G) contains:
(G1) an epoxy group-containing silane expressed by the general formula:

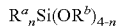

$$R^a{}_nSi(OR^b)_{4-n}$$

(where $R^a$ represents an organic group containing a monovalent epoxy group, and $R^b$ represents an alkyl group with 1 to 6 carbon atoms, or a hydrogen atom.
n represents a number within a range of 1 to 3),
or a partially hydrolyzed condensate thereof; and
(G2) an organic compound having at least two alkoxysilyl groups in a molecule, in addition to containing a bond other than a silicon-oxygen bond between the silyl groups;
at a mass ratio of 5:95 to 95:5, preferably a mass ratio of 50:50 to 95:5, and more preferably at a mass ratio of 60:40 to 90:30.

Components (G1) and (G2) alone improve the initial adhesion of organopolysiloxane cured products, but when used in combination with components (E) and (F) at the mass ratio described above, the initial adhesion, adhesive durability, and adhesive strength (permanent adhesion) of the organopolysiloxane cured products are greatly improved.

Examples of component (G1) described above include 3-glycidoxyprolyltrimethoxysilane, 3-glycidoxypropylmethyldimethoxysilane, 2-(3,4-epoxy cyclohexyl)ethyltrimethoxysilane, and 2-(3,4-epoxy cyclohexyl)ethylmethyldimethoxysilane.

Examples of component (G2) described above include 1,6-bis(trimethoxysilyl)hexane, 1,6-bis(triethoxysilyl)hexane, 1,4-bis(trimethoxysilyl)hexane, 1,5-bis(trimethoxysilyl)hexane, 2,5-bis(trimethoxysilyl)hexane, 1-methyldimethoxysilyl-6-trimethoxysilylhexane, 1-phenyldiethoxysilyl-6-triethoxysilylhexane, and 1,6-bis(methyldimethoxysilyl)hexane, and other disilyalkanes.

Reaction mixtures of amino group-containing organoalkoxysilanes and epoxy group-containing organoalkoxysilanes (including carbasilatrane and silatrane derivatives having specific structures) disclosed in Japanese Examined Patent Application Publication No. S52-8854 and Japanese Unexamined Patent Application H10-195085 may be further used as adhesion-imparting agents other than the components (G1) and (G2) above.

[Hydrosilylation Reaction Inhibitor]

The composition according to the present invention preferably further contains a hydrosilylation reaction inhibitor in terms of the handling workability thereof. The hydrosilylation reaction inhibitor is a component for suppressing the hydrosilylation reaction of the curable organopolysiloxane composition according to the present invention, with specific examples thereof including reaction inhibitors such as acetylenic ones (such as ethynyl cyclohexanol), amine based ones, carboxylic acid ester based ones, and phosphite ester based ones. The amount of the reaction inhibitor added is usually 0.001 to 5 mass % of the total curable organopolysiloxane composition. 3-methyl-1-butyn-3-ol, 3,5-dimethyl-1-hexyne-3-ol, and 3-phenyl-1-butyne-3-ol (=phenylbutynol), and other acetylenic compounds, 3-methyl-3-pentene-1-yne, 3,5-dimethyl-3-hexene-1-yne, and other enyne compounds, 1,3,5,7-tetramethyl-1,3,5,7-tetravinylcyclotetrasiloxane, 1,3,5,7-tetramethyl-1,3,5,7-tetrahexenylcyclotetrasiloxane, and other cycloalkenylsiloxanes, and benzotriazole and other triazole compounds can be particularly used without any limitation in order to improve the handling workability of the present composition.

[Heat Resistance-Imparting Agent]

The composition and cured product according to the present invention may contain a known heat resistance-imparting agent. The blended amount of the heat resistance-imparting agent may be within a range of 0.01 to 5.0 mass % of the total composition, or may be within a range of 0.05 to 0.2 mass %, or 0.07 to 0.1 mass %.

Examples of the heat resistance-imparting agent include iron oxide, titanium oxide, cerium oxide, magnesium oxide, zinc oxide, and other metal oxides, cerium hydroxide and other metal hydroxides, phthalocyanine compounds, cerium silanolate, cerium fatty acid salts, reaction products of an organopolysiloxane with a cerium carboxylic acid salt, and the like. Particularly suitably, component (G) is a phthalocyanine compound, for example, an additive selected from the group consisting of a metal-free phthalocyanine compound and a metal-containing phthalocyanine compound disclosed in JP 2014-503680 W is suitably used, with copper phthalocyanine compounds particularly suitable among the metal-containing phthalocyanine compounds. One example of the most suitable and non-limiting heat resistance imparting agent is 29 H,31H-phthalocyaninato(2-)-N29,N30,N31, N32 copper. Such phthalocyanine compounds are commercially available, for example, Stan-tone (trademark) 40SP03 from PolyOne Corporation (Avon Lake, Ohio, USA.)

[Other Additives]

In addition to the abovementioned components, optional components may be added to the curable organopolysiloxane composition according to the present invention so long as the object of the present invention is not impaired. Examples of optional components include: an organopolysiloxane that does not contain a silicon-bonded hydrogen atom or a silicon-bonded alkenyl group, a cold resistance imparting agent, a flame retardant imparting agent, a pigment, a dye, and the like. Furthermore, the curable organopolysiloxane composition of the present invention can, if desired, contain: one or more type of antistatic agents including known surfactants and the like; a dielectric filler; an electrically conductive filler; a mold release component; a thixotropy-imparting agent; an antifungal agent; and the like. If desired, an organic solvent may be added.

[Manufacturing Method and Dosage Form of Composition]

The curable organopolysiloxane composition of the present invention can be prepared by mixing each of the components, and an example of a mixing device includes the same device as that exemplified in the surface treatment of component (D).

The curable organopolysiloxane compositions according to the present invention may be one-component compositions, preferably including the aforementioned hydrosilylation reaction inhibitor and other components, or multi-component compositions containing two or more compositions that are stored separately. In this case, component (A), component (B), and component (C) described above must not be included at the same time. This is because when component (A), component (B), and component (C) are blended simultaneously, a crosslinking reaction starts spontaneously and the storage stability of the composition is lost in a short period of time, and thus the long-term storage stability and handling workability, which are objectives of multi-component compositions, may not be achieved. Note that the multi-component composition is coated or applied after being mixed in a common container at the time of use using a mixer or other mechanical force, or using a dispenser or the like capable of mixing a plurality of components.

[Curability, Particularly Low Temperature Curability Below 130° C.]

The curable organopolysiloxane compositions according to the present invention are cured by a hydrosilylation reaction to form an organopolysiloxane cured product with excellent thermal conductivity and adhesive properties to a base material. While not particularly limited thereto, the temperature condition for curing the hydrosilylation reaction curing type silicone composition is normally within a range of 20° C. to 200° C.

As described above, the curable organopolysiloxane composition according to the present invention has an advantage in which, by using components (D) to (G) in combination, the initial adhesion, adhesive durability, and adhesive strength (permanent adhesion) of the organopolysiloxane cured product to a base material are not impaired, even in a low temperature curing process below 130° C., while providing high thermal conductivity. In this case, a suitable curing temperature may be less than 130° C., such as in a range of 90 to 125° C., and an organopolysiloxane cured product provided with sufficient mechanical strength, thermal conductivity, and adhesive properties can be obtained in a few seconds to a few hours, depending on the need and coating shape. Furthermore, by using a photoactive platinum-based hydrosilylation catalyst (such as part of component (C) and the like) in combination, it is possible to achieve even lower temperature and shorter curability.

By using the curable organopolysiloxane composition according to the present invention, a heat dissipating structure can be obtained by applying the curable organopolysiloxane composition described above to a heat dissipating component or a circuit board on which the heat dissipating component is mounted, and forming a cured product at less than 130° C., such as in a range of 90 to 125° C., to provide a heat dissipating member.

[Thermal Conductivity]

The curable organopolysiloxane composition of the present invention can be stably filled with a large amount of thermally conductive filler and provides a thermal conductivity of 2.5 W/mK or higher, preferably 3.0 W/mK or higher, and more preferably 3.3 W/mK or more. Note that the curable organopolysiloxane compositions of the present invention can design a composition and cured product with a thermal conductivity of 3.3 to 7.0 W/mK, and can achieve the aforementioned excellent low temperature curing and adhesive strength/adhesive durability.

[Applications and Heat Dissipation Structures]

The curable organopolysiloxane composition of the present invention and a cured product thereof are useful as heat transfer materials (thermally conductive members) to be interposed at the interface between a thermal boundary surface of a heat-generating component and a heat dissipating member such as a heat sink, a circuit board, or the like for cooling the heat-generating component by heat conduction, and a heat dissipating structure can be formed provided therewith. Herein, although the type, size, and fine parts of heat-generating components are not particularly limited, the cured product obtained by curing the curable organopolysiloxane composition of the present invention has high thermal conductivity and excellent initial adhesion and adhesive strength to a member, and thus is resistant to peeling or separating from heat generating members due to vibration and the like, has high adhesion and followability, and has excellent industrial productivity, making it suitable for automotive components, electrical or electronic components, and heat dissipating structures for electrical or electronic devices including cell-type secondary batteries.

Although the structure of such a heat dissipating structure is not particularly limited, an example is a heat dissipation structure with a heat dissipating member provided via a curable organopolysiloxane composition or cured product thereof on a heat dissipating component or a circuit board on which this heat dissipating component is mounted. Such a structure is exemplified, for example, by a structure in which an electronic component, which is a heat dissipating component, is mounted on a circuit board and the heat generated by the electronic component is dissipated by heat dissipating members via a thin film layer of the curable organopolysiloxane composition or a cured product thereof, and these members may be preferably arranged not only on a horizontal surface but also on an inclined or vertical surface due to the strong adhesive force that is a feature of the present invention.

In such a heat dissipating structure, the thickness of the curable organopolysiloxane composition or cured product thereof is not particularly limited, but may be within a range of 0.1 to 100 mm to efficiently transfer heat generated from an electronic component filled with the composition or cured product thereof without a gap to a heat dissipating member. Electrical and electronic devices equipped with a member made up of the thermally conductive silicone composition are not particularly limited, but include: for example, secondary batteries such as cell-based lithium-ion electrode secondary batteries and cell-stack fuel cells; electronic circuit boards such as printed circuit boards; IC chips packaged with optical semiconductor elements such as diodes (LEDs), organic electric field element (organic EL), laser diodes and LED arrays; CPUs used in electronic devices such as personal computers, digital video disks, mobile phones, and smartphones; and LSI chips such as driver ICs and memory, and the like. In particular, in high performance digital switching circuits formed with high integration density, heat removal (heat dissipation) is a major factor in the performance and reliability of the integrated circuits. Thermally conductive members using the curable organopolysiloxane composition according to the present invention have superior heat dissipation and handling workability when applied to power semiconductor applications such as engine control, power train systems, air conditioner control, and the like in transportation equipment, and can also maintain a strong adhesive force with a member and achieve superior heat resistance and thermal conductivity when incorporated into in-vehicle electronic components such as electronic control units (ECU) and the like and be used in a harsh environment.

EXAMPLES

The present invention will be described below by way of examples; however, the present invention is not limited thereto. In the Examples and Comparative Examples shown below, the following compounds or compositions were used as raw materials. Note that the curing temperature is 120° C.
[Preparation of Compositions and Evaluation Samples]

Components (A) to (G) were mixed as follows to obtain curable organopolysiloxane compositions of Examples 1 to 7 and Comparative Examples 1 to 6 (hereinafter referred to as "thermally conductive silicone compositions"). Thereafter, the resulting compositions were filled into a 50 mm long, 30 mm wide, and 6 mm thick mold, and cured in a press at a temperature of 120° C. for 30 minutes. Thereafter, the product was then removed from the mold and cured for one day in a 25° C. atmosphere.
[Thermal Conductivity Design]

The curable organopolysiloxane compositions, which were obtained by the composition parts described in Examples 1 to 7 and Comparative Examples 1 to 6, were blended with component (D) to obtain a thermal conductivity of 3.0 W/mK. The thermal conductivity was measured by a hot disc method using a TPS-500 manufactured by Kyoto Electronics Industry Co., Ltd. by using two pieces of the cured product obtained as described above.

The viscosity, hardness, tensile strength, elongation, thermal conductivity, and adhesion (adhesive strength and cohesive failure rate) of the curable organopolysiloxane compositions in the examples (Examples 1 to 6/Comparative Examples 1 to 6) were measured as follows and shown respectively in Table 1 for each example and Table 2 for each comparative example.
[Evaluation Method of Viscosity]

The viscosity (Pa·s) of the curable organopolysiloxane compositions at 25° C. was measured using a viscometer (Rheocompass MCR102 manufactured by Anton Paar). The geometry was measured using 20 mm diameter parallel plates with a gap of 600 μm and a shear rate of 10.0 (1/s).
[Evaluation Method of Hardness]

The curable organopolysiloxane composition was filled into a 120 mm long, 120 mm wide, and 2 mm thick mold, and cured in a press at a temperature of 120° C. for 30 minutes. Three of the resulting 2 mm thick sheets were overlaid and the hardness was measured using a Type A durometer as specified in JIS K 6253.
[Evaluation Method of Tensile Strength and Elongation]

The curable organopolysiloxane composition was filled into a 120 mm long, 120 mm wide, and 2 mm thick mold, and cured in a press at a temperature of 120° C. for 30 minutes. The resulting 2 mm thick sheets were punched out in the form of dumbbell No. 3 and measured by the fully automatic rubber tensile testing system SES-1000 manufactured by Shimadzu Corporation in accordance with JIS K 6251.
[Method for Evaluating the Adhesiveness of Curable Organopolysiloxane Composition]

The curable organopolysiloxane composition mixture was sandwiched between two aluminum test panels (aluminum A1050P) to a thickness of 1 mm and cured under oven conditions at a temperature of 120° C. for 30 minutes. The tensile shear adhesive strength of the adhesive test bodies obtained was measured with a Tensilon universal testing machine RTC-1325A manufactured by Orientec Co., Ltd. in accordance with the method specified in JIS K 6850:1999 "Testing method for tensile shear adhesive strength of adhesives and rigid adherends." After the measurement, the cohesive failure rate was measured by checking the fracture surface. Note that a high cohesive failure rate indicates that the adhesive durability is high, and the nature of the adhesion is close to permanent adhesion.

The composition of the present invention is formed using each of the following components.

Component (A):
  A-1: Dimethylpolysiloxane blocked with dimethylvinylsiloxy groups at both ends of a molecular chain (viscosity: 2,000 mPa·s, amount of Vi: 0.22 mass %)
  A-2: Methylvinylsiloxane-dimethylsiloxane copolymer blocked with trimethylsiloxy groups at both ends of a molecular chain (viscosity: 8,200 mPa·s, amount of Vi: 0.29 mass %)

Component (B):
  B-1: Dimethylsiloxane-methylhydrogensiloxane copolymer blocked with dimethylhydroxy groups at both ends of a molecular chain, average of 3 in the molecule, average of 1 in a molecular side chain (viscosity: 20 mPa·s, amount of Si—H: 0.14 mass %)

Component (C):
  C-1: Complex of platinum and 1,3-divinyl-1,1,3,3-tetramethyldisiloxane with a platinum concentration of 0.6% by weight Component (D):
  D-1: Crushed aluminum oxide powder with an average particle diameter of 0.4 μm
  D-2: Crushed aluminum oxide powder with an average particle diameter of 3.0 μm
  D-3: Spherical melt-solidified aluminum oxide powder with an average particle diameter of 35 μm Component (E):
  E-1: Polyorganosiloxane represented by the following formula

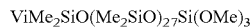

E-2: Polyorganosiloxane expressed by the following formula:

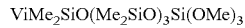

Other Treatment Agent:
  non-E-3: Polyorganosiloxane expressed by the following formula:

[Formula 1]

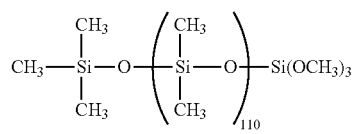

Component (F):
  F-1: Decyltrimethoxysilane Other Treatment Agent:
  non-F-2: Methyltrimethoxysilane Component (G):
  G-1: Glycidoxypropyltrimethoxysilane
  G-2: 1,6-bis(trimethoxysilyl)hexane

Example 1

100 parts by mass of component (A-1), 8.75 parts by mass of component (E-1), and 2.5 parts by mass of component (F-1) were weighed, to which 250 parts by mass of component (D-1), 250 parts by mass of component (D-2), and 625 parts by mass of component (D-3) were sequentially mixed over 60 minutes. After homogenization, the mixture was heated and mixed at 160° C. for 60 minutes under reduced pressure, and then cooled to room temperature. 13.1 parts by mass of component (B-1), 0.75 parts by mass of component (G-1), 0.25 parts by mass of component (G-2), and 0.31 parts by mass of phenylbutynol as a hydrosilylation reaction inhibitor were uniformly mixed in the mixture. Thereafter, 1.25 parts by mass of component (C-1) were uniformly mixed to obtain a curable organopolysiloxane composition.

Example 2

A curable organopolysiloxane composition was obtained in the same manner as in Example 1, except that 2.5 parts by mass of component (F-1) in Example 1 was changed to 1.25 parts by mass.

Example 3

A curable organopolysiloxane composition was obtained in the same manner as in Example 1, except that 8.75 parts by mass of component (E-1) in Example 1 was changed to 4.38 parts by mass, 2.5 parts by mass of component (F-1) was changed to 3.75 parts by mass, and 13.1 parts by mass of component (B-1) was changed to 10.9 parts by mass.

Example 4

A curable organopolysiloxane composition was obtained in the same manner as in Example 1, except that 8.75 parts by mass of component (E-1) in Example 1 was changed to 2.19 parts by mass, 2.5 parts by mass of component (F-1) was changed to 4.38 parts by mass, and 13.1 parts by mass of component (B-1) was changed to 9.8 parts by mass.

Example 5

A curable organopolysiloxane composition was obtained in the same manner as in Example 1, except that 8.75 parts by mass of component (E-1) in Example 1 was changed to 2.5 parts by mass of component (E-2) and 13.1 parts by mass of component (B-1) was changed to 14.4 parts by mass.

Example 6

A curable organopolysiloxane composition was obtained in the same manner as in Example 1, except that 100 parts by mass of component (A-1) in Example 1 was changed to 100 parts by mass of component (A-2) and 13.1 parts by mass of component (B-1) was changed to 15.6 parts by mass.

TABLE 1

| Component | Example 1 | Example 2 | Example 3 | Example 4 | Example 5 | Example 6 |
|---|---|---|---|---|---|---|
| A-1 | 100 | 100 | 100 | 100 | 100 | |
| A-2 | | | | | | 100 |
| B-1 | 13.1 | 13.1 | 10.9 | 9.8 | 14.4 | 15.6 |
| C-1 | 1.25 | 1.25 | 1.25 | 1.25 | 1.25 | 1.25 |
| D-1 | 250 | 250 | 250 | 250 | 250 | 250 |
| D-2 | 250 | 250 | 250 | 250 | 250 | 250 |
| D-3 | 625 | 625 | 625 | 625 | 625 | 625 |
| E-1 | 8.75 | 8.75 | 4.38 | 2.19 | | 8.75 |
| E-2 | | | | | 2.5 | |
| F-1 | 2.5 | 1.25 | 3.75 | 4.38 | 2.5 | 2.5 |
| G-1 | 0.75 | 0.75 | 0.75 | 0.75 | 0.75 | 0.75 |
| G-2 | 0.25 | 0.25 | 0.25 | 0.25 | 0.25 | 0.25 |
| phenylbutynol | 0.31 | 0.31 | 0.31 | 0.31 | 0.31 | 0.31 |
| Molar ratio of SiH/alkenyl group | 1.48 | 1.48 | 1.49 | 1.50 | 1.48 | 1.48 |

TABLE 1-continued

| Component | Example 1 | Example 2 | Example 3 | Example 4 | Example 5 | Example 6 |
|---|---|---|---|---|---|---|
| Viscosity (Pa·s) | 175 | 205 | 239 | 264 | 241 | 297 |
| Hardness (JIS Type A) | 93 | 92 | 80 | 62 | 91 | 94 |
| Tensile strength (MPa) | 3.6 | 3.3 | 1.6 | 1.0 | 4.3 | 4.4 |
| Elongation (%) | 51 | 44 | 57 | 72 | 51 | 14 |
| Thermal conductivity (W/m·K) | 3.4 | 3.3 | 3.5 | 3.5 | 3.3 | 3.3 |
| Adhesive strength (MPa) | 2.7 | 2.2 | 1.5 | 1.5 | 3.3 | 2.9 |
| Cohesive failure rate (%) | 100 | 70 | 100 | 100 | 100 | 80 |

Comparative Example 1

A curable organopolysiloxane composition was obtained in the same manner as in Example 1, except that 8.75 parts by mass of component (E-1) was replaced with 12.5 parts by mass of component (non-E-3) and 13.1 parts by mass of component (B-1) was changed to 8.8 parts by mass, from Example 1.

Comparative Example 2

A curable organopolysiloxane composition was obtained in the same manner as in Example 1, except that 2.5 parts by mass of component (F-1) was removed from Example 1.

Comparative Example 3

A curable organopolysiloxane composition was obtained in the same manner as in Example 1, except that 8.75 parts by mass of component (E-1) was removed, 2.5 parts by mass of component (F-1) was changed to 5.0 parts by mass, and 13.1 parts by mass of component (B-1) was changed to 8.8 parts by mass, from Example 1.

Comparative Example 4

A curable organopolysiloxane composition was obtained in the same manner as in Example 1, except that 2.5 parts by mass of component (F-1) in Example 1 was replaced with 1.25 parts by mass of component (non-F-2).

Comparative Example 5

A curable organopolysiloxane composition was obtained in the same manner as in Comparative Example 4, except that 0.75 parts by mass of component (G-1) and 0.25 parts by mass part of component (G-2) were removed from Comparative Example 4.

Comparative Example 6

A curable organopolysiloxane composition was obtained in the same manner as in Example 1, except that 0.75 parts by mass of component (G-1) and 0.25 parts by mass of component (G-2) were removed from Example 1.

TABLE 2-1

| Component | Comparative Example 1 | Comparative Example 2 | Comparative Example 3 |
|---|---|---|---|
| A-1 | 100 | 100 | 100 |
| B-1 | 8.8 | 13.1 | 8.8 |
| C-1 | 1.25 | 1.25 | 1.25 |
| D-1 | 250 | 250 | 250 |
| D-2 | 250 | 250 | 250 |
| D-3 | 625 | 625 | 625 |
| E-1 | | 8.75 | |
| non-E-3 | 12.5 | | |
| F-1 | 2.5 | | 5.0 |
| non-F-2 | | | |
| G-1 | 0.75 | 0.75 | 0.75 |
| G-2 | 0.25 | 0.25 | 0.25 |
| phenylbutynol | 0.31 | 0.31 | 0.31 |
| Molar ratio of SiH/alkenyl group | 1.51 | 1.48 | 1.51 |
| Viscosity (Pa·s) | 230 | 254 | 322 |
| Hardness (JIS Type A) | 52 | 91 | 55 |
| Tensile strength (MPa) | 0.9 | 3.4 | 1.0 |
| Elongation (%) | 94 | 41 | 82 |
| Thermal conductivity (W/m·K) | 3.4 | 3.5 | 3.7 |
| Adhesive strength (MPa) | 0.9 | 2.0 | 0.8 |
| Cohesive failure rate (%) | 100 | 0 | 100 |

| Component | Comparative Example 4 | Comparative Example 5 | Comparative Example 6 |
|---|---|---|---|
| A-1 | 100 | 100 | 100 |
| B-1 | 13.1 | 13.1 | 13.1 |
| C-1 | 1.25 | 1.25 | 1.25 |
| D-1 | 250 | 250 | 250 |
| D-2 | 250 | 250 | 250 |
| D-3 | 625 | 625 | 625 |
| E-1 | 8.75 | 8.75 | 8.75 |
| non-E-3 | | | |
| F-1 | | | 2.5 |
| non-F-2 | 1.25 | 1.25 | |
| G-1 | 0.75 | | |
| G-2 | 0.25 | | |
| phenylbutynol | 0.31 | 0.31 | 0.31 |
| Molar ratio of SiH/alkenyl group | 1.48 | 1.48 | 1.48 |
| Viscosity (Pa·s) | 239 | 159 | 125 |
| Hardness (JIS Type A) | 92 | 91 | 92 |
| Tensile strength (MPa) | 4.0 | 5.0 | 4.9 |
| Elongation (%) | 44 | 43 | 47 |
| Thermal conductivity (W/m·K) | 3.4 | 2.9 | 2.9 |
| Adhesive strength (MPa) | 2.5 | 1.8 | 1.9 |
| Cohesive failure rate (%) | 20 | 0 | 0 |

SUMMARY

The thermally conductive curable organopolysiloxane compositions according to Examples 1 to 6 had adhesive strengths exceeding 1 MPa and cohesive failure rates as high as 70% or more, despite curing at a low temperature of 120° C. It was confirmed that the compositions according to Examples 1 to 6 are cured products provided with high adhesive properties, and particularly permanent adhesive properties, even at a low temperature of 120° C., and can achieve high thermal conductivity (3.3 W/mK or more in the examples) and adhesive reliability.

On the other hand, in Comparative Examples 1 and 3, although the cohesive failure rate exceeds 100%, the adhesive strength does not exceed 1 MPa, and they are expected to easily fail under stress deformation in actual use. Furthermore, in Comparative Examples 2, 4, 5, and 6, although the adhesive strength exceeded 1 MPa, the cohesive failure rate was low at 20% or less, resulting in inferior adhesive reliability. Therefore, when any of component (E), component (F), or component (G) are not used, it was not possible to obtain a curable organopolysiloxane composition with excellent thermal conductivity, adhesive properties, and adhesive reliability.

The invention claimed is:

1. A curable organopolysiloxane composition, comprising:
   (A) 100 parts by mass of an alkenyl group-containing organopolysiloxane having a viscosity of 10 to 100,000 mPa·s at 25° C.;
   (B) an organohydrogenpolysiloxane of an amount in which silicon atom-bonded hydrogen atoms in component (B) are 0.1 to 10 mols with respect to 1 mol of alkenyl groups in component (A);
   (C) a hydrosilylation-reaction catalyst in a catalytic amount;
   (D) 400 to 3,500 parts by mass of a thermally conductive filler;
   (E) 0.005 to 20 parts by mass of a siloxane compound expressed by general formula (1):

$R^{alk}R^1{}_2SiO(R^1{}_2SiO)_aR^1{}_2Si{-}R^2{-}SiR^1{}_{(3-b)}(OR^3)_b$ where $R^{alk}$ represents an alkenyl group, $R^1$ independently represents an unsubstituted or substituted monovalent hydrocarbon group, $R^2$ represents an oxygen atom or divalent hydrocarbon group, $R^3$ independently represents a hydrogen atom, an alkyl group, an alkoxyalkyl group, or an acyl group, a represents an integer from 1 to 250, and b represents an integer from 1 to 3,
   having a viscosity at 25° C. within a range of 10 to 10,000 mPa·s, and
   having an alkenyl group or a hydrolyzable silyl group on a molecular chain terminal;
   (F) 0.005 to 10 parts by mass of an alkoxysilane having an alkyl group with 6 or more carbon atoms in a molecule or a hydrolyzed condensate thereof; and
   (G) 0.005 to 5 parts by mass of an adhesion promoter;
   wherein the thermal conductivity is 3.0 W/m·K or more.

2. The curable organopolysiloxane composition according to claim 1, wherein the thermal conductivity is 3.3 W/m·K or more.

3. The curable organopolysiloxane composition according to claim 1, wherein component (D) is surface-treated by component (E) and component (F).

4. The curable organopolysiloxane composition according to claim 1, wherein component (D) is (D1) a plate-shaped boron nitride powder with an average particle diameter of 0.1 to 150 μm, (D2) a granulated or spherically compacted boron nitride powder with an average particle diameter of 0.1 to 500 μm, (D3) a spherical melt-solidified and/or crushed aluminum oxide powder with an average particle diameter of 0.01 to 150 μm, (D4) an irregular or spherical aluminum nitride powder with an average particle diameter of 0.1 to 150 μm, (D5) a graphite having an average particle diameter of 0.01 to 50 μm, or a mixture of two or more of these fillers.

5. The curable organopolysiloxane composition according to claim 1, wherein component (G) comprises:
   (G1) an epoxy group-containing silane expressed by the general formula:

$R^a{}_nSi(OR^b)_{4-n}$ where $R^a$ represents an organic group containing a monovalent epoxy group, and $R^b$ represents an alkyl group with 1 to 6 carbon atoms, or a hydrogen atom, n represents a number within a range of 1 to 3,
   or a partially hydrolyzed condensate thereof; and (G2) an organic compound having at least two alkoxysilyl groups in a molecule, in addition to containing a bond other than a silicon-oxygen bond between the silyl groups;
   at a mass ratio of 5:95 to 95:5.

6. A thermally conductive member, comprising the curable organopolysiloxane composition according to claim 1 or a cured product thereof.

7. A heat dissipating structure, comprising the thermally conductive member according to claim 6.

8. A heat dissipating structure, comprising a heat dissipating member provided via the curable organopolysiloxane composition according to claim 1 or a cured product thereof on a heat dissipating component or a circuit board on which the heat dissipating component is mounted.

9. The heat dissipating structure according to claim 7, which is an electrical or electronic device.

10. The heat dissipating structure according to claim 7, which is an electrical or electronic component or a secondary battery.

11. A method of manufacturing the curable organopolysiloxane composition according to claim 1, the method comprising:
    mixing component (A), component (D), component (E), and component (F) to provide a mixture;
    heating and mixing the mixture; and
    mixing the mixture and another component.

12. A method of manufacturing a heat dissipating structure, the method comprising:
    applying the curable organopolysiloxane composition according to claim 1 to a heat dissipating component or a circuit board on which the heat dissipating component is mounted; and
    curing the applied composition at a temperature less than 130° C.

13. The curable organopolysiloxane composition according to claim 1, wherein component (D) comprises:
    (D-1) crushed aluminum oxide powder with an average particle diameter of 0.4 μm;
    (D-2) crushed aluminum oxide powder with an average particle diameter of 3.0 μm; and
    (D-3): spherical melt-solidified aluminum oxide powder with an average particle diameter of 35 μm.

14. The curable organopolysiloxane composition according to claim 1, wherein component (E) comprises at least one of the following two polyorganosiloxanes:
    (E-1) a polyorganosiloxane represented by the following formula $ViMe_2SiO(Me_2SiO)_{27}Si(OMe)_3$ (E-2) a polyorganosiloxane expressed by the following formula:

$ViMe_2SiO(Me_2SiO)_3Si(OMe)_3$ where Vi is a vinyl group and Me is a methyl group.

15. The curable organopolysiloxane composition according to claim 14, wherein component (F) comprises:
    (F-1) decyltrimethoxysilane.

16. The curable organopolysiloxane composition according to claim 15, wherein component (D) is surface-treated by component (E) and component (F).

17. The curable organopolysiloxane composition according to claim 1, wherein component (F) comprises:
    (F-1) decyltrimethoxysilane.

18. The curable organopolysiloxane composition according to claim 1, wherein component (G) comprises:
(G-1) glycidoxypropyltrimethoxysilane; and
(G-2) 1,6-bis(trimethoxysilyl) hexane.

19. The curable organopolysiloxane composition according to claim 1, wherein:
i) the amount of silicon atom-bonded hydrogen atoms in component (B) is 0.4 to 2.0 mols with respect to 1 mol of alkenyl groups in at least component (A); and
ii) the amount of component (D) is within a range of 600 to 2,500 parts by mass; the amount of component (E) is within a range of 0.5 to 10 parts by mass; and the amount of component (F) is within a range of 0.5 to 7.5 parts by mass; each with respect to 100 parts by mass of component (A) in the entire composition.

20. A curable organopolysiloxane composition, comprising:
(A) 100 parts by mass of an alkenyl group-containing organopolysiloxane having a viscosity of 10 to 100,000 mPa·s at 25° C.;
(B) an organohydrogenpolysiloxane of an amount in which silicon atom-bonded hydrogen atoms in component (B) are 0.1 to 10 mols with respect to 1 mol of alkenyl groups in component (A);
(C) a hydrosilylation-reaction catalyst in a catalytic amount;
(D) 400 to 3,500 parts by mass of a thermally conductive filler;
(E) 0.005 to 20 parts by mass of a siloxane compound expressed by general formula (1):

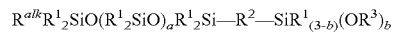

$R^{alk}R^1{}_2SiO(R^1{}_2SiO)_aR^1{}_2Si-R^2-SiR^1{}_{(3-b)}(OR^3)_b$ where $R^{alk}$ represents an alkenyl group, $R^1$ independently represents an unsubstituted or substituted monovalent hydrocarbon group, $R^2$ represents an oxygen atom or divalent hydrocarbon group, $R^3$ independently represents a hydrogen atom, an alkyl group, an alkoxyalkyl group, or an acyl group, a represents an integer from 1 to 250, and b represents an integer from 1 to 3,
having a viscosity at 25° C. within a range of 10 to 10,000 mPa·s, and
having an alkenyl group or a hydrolyzable silyl group on a molecular chain terminal;
(F) 0.5 to 10 parts by mass of an alkoxysilane having an alkyl group with 6 or more carbon atoms in a molecule or a hydrolyzed condensate thereof; and
(G) 0.005 to 5 parts by mass of an adhesion promoter.

* * * * *